US009058480B2

(12) United States Patent
Kuscher et al.

(10) Patent No.: US 9,058,480 B2
(45) Date of Patent: Jun. 16, 2015

(54) DIRECTIONAL TOUCH UNLOCKING FOR ELECTRONIC DEVICES (71) Applicant: Google Inc., Mountain View, CA (US)

(72) Inventors: Alexander Friedrich Kuscher, San Francisco, CA (US); Andrew Warr, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/072,738

(22) Filed: Nov. 5, 2013

(65) Prior Publication Data

US 2015/0128255 A1 May 7, 2015

(51) Int. Cl.
*G06F 21/00* (2013.01)
*G06F 21/36* (2013.01)
(52) U.S. Cl.
CPC ..................... *G06F 21/36* (2013.01)
(58) Field of Classification Search
CPC .... G06F 21/32; H04L 9/3231; H04L 63/0861
USPC ................................. 713/170, 182
See application file for complete search history.

(56) References Cited

U.S. PATENT DOCUMENTS

| 8,416,148 | B1* | 4/2013 | Park ............................... 345/1.1 |
| 8,504,842 | B1 | 8/2013 | Meacham |
| 2005/0008148 | A1 | 1/2005 | Jacobson |
| 2009/0284482 | A1 | 11/2009 | Chin |
| 2010/0117971 | A1* | 5/2010 | Chen ............................ 345/173 |
| 2013/0135204 | A1 | 5/2013 | Raffle et al. |
| 2013/0147795 | A1* | 6/2013 | Kim et al. .................... 345/419 |
| 2013/0154921 | A1* | 6/2013 | Norman ........................ 345/156 |
| 2013/0173925 | A1* | 7/2013 | Yen et al. ....................... 713/186 |
| 2013/0201155 | A1 | 8/2013 | Wu et al. |
| 2013/0285925 | A1 | 10/2013 | Stokes et al. |
| 2013/0333020 | A1* | 12/2013 | Deshpande .................... 726/16 |

* cited by examiner

*Primary Examiner* — Mohammad W Reza
(74) *Attorney, Agent, or Firm* — McDermott Will & Emery LLP (57) ABSTRACT A system and machine-implemented method for matching input gestures on a touch interface to a security pattern to allow user access to an electronic device or account. The security pattern may correspond to a combination of linear and non-linear input gestures relating to directional changes of the input gestures. A determination of the security pattern may be based on the end motion and speed of each input gesture.

21 Claims, 5 Drawing Sheets

DIRECTIONAL TOUCH UNLOCKING FOR ELECTRONIC DEVICES

BACKGROUND

The present disclosure generally relates to security for electronic devices and, in particular, to using pattern recognition to unlock an electronic device.

Security for logging in to or unlocking an electronic device typically requires a password that is memorized by the user. A discrete unlocking gesture by a user may also be used to unlock an electronic device (e.g., move an unlock button from left to right on a smartphone touchscreen display). Combining a discrete unlocking gesture and a password may also be used to unlock an electronic device.

SUMMARY

The disclosed subject matter relates to a computer implemented method. The method includes receiving, by one or more processors, an input pattern from a touch based input device, the input pattern comprising one or more directional changes corresponding to directional changes of user gestures made on the input device. The method also includes determining, by one or more processors, if the directional changes of the input pattern match directional changes of a security pattern associated with a user's security profile. The method further includes providing an unlock signal if the directional changes of the input pattern match the directional changes of the security pattern, the unlock signal granting user access to a user device or a user account.

The disclosed subject matter further relates to a computing device. The device includes a touch based input device configured to receive a plurality of user gestures, the user gestures comprising an input pattern. The device also includes a memory configured to store a security pattern. The device further includes one or more processors configured to determine a match between the input pattern and the security pattern based on the ending movement and the speed of one or more of the user gestures on the input device, wherein an unlock signal is generated when a match between the input pattern and the security pattern is determined.

The disclosed subject matter also relates to a non-transitory machine-readable storage medium comprising machine readable instructions for causing a processor to execute a method for unlocking an electronic device. The method includes receiving an input pattern from a touch based input device, the input pattern comprising one or more directional changes corresponding to directional changes of user gestures made on the input device, the directional changes of the input pattern being based on an end movement and a speed of at least one user gesture. The method also includes determining if the directional changes of the input pattern match directional changes of a security pattern associated with a user's security profile. The method further includes providing an unlock signal if the directional changes of the input pattern match the directional changes of the security pattern, the unlock signal granting user access to a user device or a user account.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein. In some instances, structures and components are shown in block diagram form in order to avoid obscuring the concepts of the subject technology.

As noted above, security for logging in to an electronic device is cumbersome, typically requiring the user to input a strong password that may be difficult to memorize. A device may be unlocked using defined location based gestures on an input interface (e.g., trackpad, touchscreen) of an electronic device. For example, a 3×3 grid of dots may be shown on a touch screen display of a smartphone for which a user may use a pattern of up/down/left/right gestures with a finger in order to unlock the smartphone, where each gesture conforms to discrete locations (e.g., from the uppermost left dot across to the uppermost right dot). For a trackpad based electronic device, a visual representation of a grid pattern is shown on the device display, increasing the possibility of another person seeing the unlock sequence as it is displayed (e.g., shoulder surfing). It is desired to provide a user friendly and secure way of unlocking an electronic device using a pattern of user gestures.

The subject technology provides for a system that uses a relative pattern (e.g., security pattern) on a touch based interface (e.g., track pad, touchscreen) to unlock an electronic device. The relative pattern is based on directional change instead of discrete locations or fixed lengths of each gesture. The directional change measurement provides that each individual gesture may be any length (e.g., not limited to the lengths between discrete locations) and be in any direction (e.g., not limited to the directions defined by going from one discrete location to one of the remaining discrete locations). For example, in the 3×3 dot grid described above, an individual gesture starting at the bottom left can only go in one of three directions (e.g., straight up, straight right, 45 degree angle up and to the right) and can only go one of two distances in any of the three directions (e.g., to the next dot or last dot in that direction). Also, any number of directional changes may be used, providing unlimited unlock combinations for improved security. The security pattern may be drawn using two or more fingers to differentiate from a single finger cursor manipulation movement, or the electronic device may be configured to determine a security or unlock pattern drawn with one finger. Further, a visual display of the unlock sequence is not needed, increasing security by making it more difficult for an observer to discern the security pattern that a user traces on the touch based interface of an electronic device.

For example, the unlock sequence may be a triangle starting from the bottom left corner, where either a small one-inch triangle may be drawn anywhere on the touch interface or a large triangle may be drawn covering the entire size of the touch interface, both of which will unlock the device. Here, the system or unlock algorithm may focus on the end of each gesture (e.g., where the finger changes direction) and the speed of the gesture (e.g., finger slows down to make the directional change).

In example aspects, the security pattern may consist of a series of shapes. For example, first a circle, then a figure eight and finishing with one cycle of a sinusoidal wave may be the security pattern. In other aspects, linear gestures and shapes may be combined, as well. For example, first a circle and then a five point star may be the security pattern.

Figure 1:
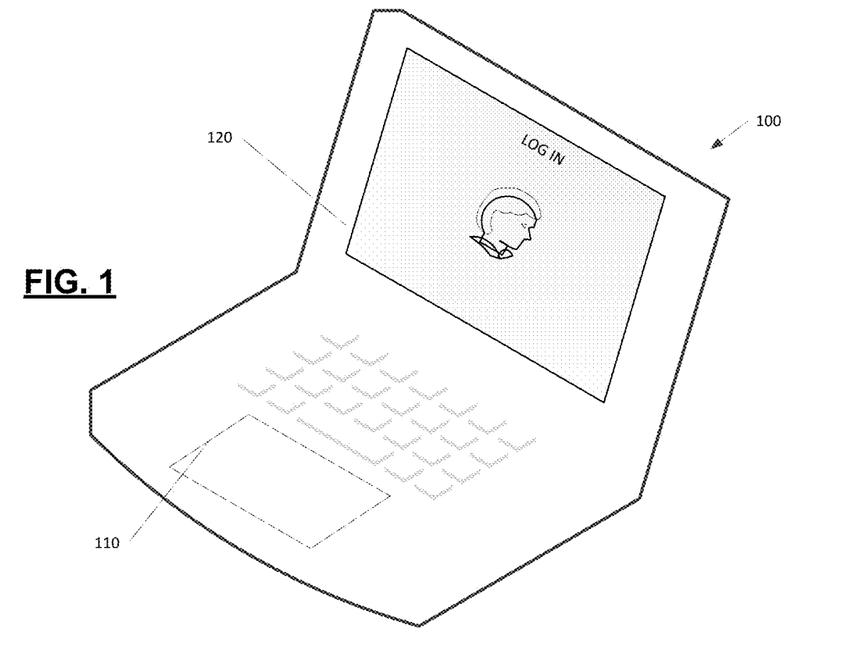
FIG. 1 illustrates an example of an electronic device showing a log-in display.

FIG. 1 illustrates an example of an electronic device 100 having a touch interface 110 and a display 120, the electronic device 100 being a laptop computer. Touch interface 110 may be a trackpad, a touchscreen, and the like. Touch interface 110 may be integrated with display 120, overlaid on display 120, a separate component of electronic device 100 positioned away from display 120, and the like. Electronic device 100 illustrated in FIG. 1 is a laptop computer with a trackpad as touch interface 110 and a flat panel display as display 120. While electronic device 100 is shown as a laptop computer, the subject technology may be provided with other electronic devices, such as a tablet computer, a smartphone, a kiosk display, and the like.

Touch interface 110 may be configured to recognize input generated by one finger, multiple fingers, a stylus, a pen, and the like. For example, when electronic device 100 is locked (e.g., all functions except the unlock function are inaccessible), touch interface 110 may be configured to recognize a single finger input as unlock input used to determine if the electronic device 100 should be unlocked. Yet, when electronic device 100 is unlocked (e.g., all functions without further security features are accessible), touch interface 110 may be configured to recognize a single finger input as cursor control input that moves a cursor around on display 120. In another example, touch interface 110 may be configured to recognize a single finger input as cursor control input, while requiring multiple finger input or a focus on field function followed by single finger input to be recognized as unlock input.

Figure 2:
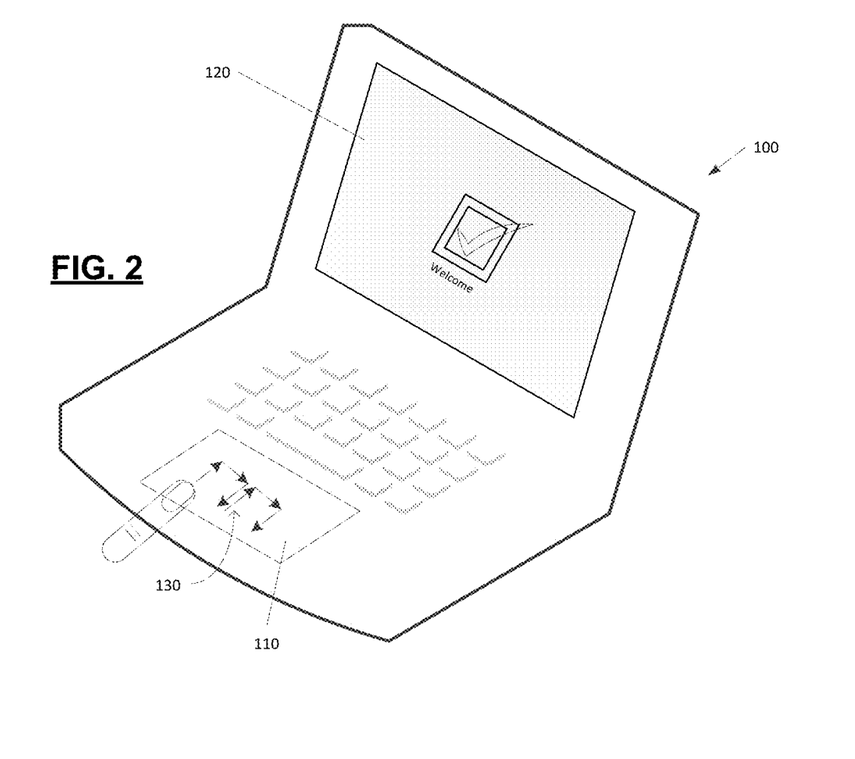
FIG. 2 illustrates an example of an unlock sequence performed by a user on a touch interface of the electronic device of FIG. 1.

Electronic device 100 is configured to interpret or determine whether a pattern of gestures performed by a user on touch interface 110 is associated with or equivalent to a security pattern 130 (see FIG. 2). Electronic device 100 may store a security pattern 130 in memory and compare a pattern drawn on touch interface 110 with the security pattern 130. If electronic device 100 determines the pattern drawn on touch interface 110 is the same pattern as security pattern 130, then electronic device 100 unlocks to provide access to some or all of the functions of electronic device 100. For example, even in the unlocked mode, some applications or apps on electronic device 100 may require that additional security steps be performed to provide access (e.g., a vault application for storing sensitive personal information may require a password for access).

As shown in FIG. 2, an example security pattern 130 follows a sequence of up-right-down-up-right-down. Thus, to unlock electronic device 100 shown in FIGS. 1 and 2, a user may trace the unlock sequence up-right-down-up-right-down on touch interface 110 (e.g., trackpad) with a finger. Electronic device 100 determines if the traced pattern is the same as stored security pattern 130 (e.g., security pattern) and unlocks the laptop for use by the user if the patterns match. If the patterns do not match, electronic device 100 may remain in locked mode and may provide a prompt (e.g., visual cue, sound) indicating that the pattern input by the user is not correct.

Electronic device 100 may run a background process (e.g., pattern recognition process) that can start recognizing or determining patterns upon receiving an initial input (e.g., finger down) from touch interface 110. Once the initial input is received, if the following input sequence deviates from the sequence of the security pattern 130, the pattern recognition process may stop and any further input from a continuing input sequence may be ignored. For example, if the user traces the pattern up-right-down-up-right-up on touch interface 110, the sequence does not match security pattern 130 shown in FIG. 2 and electronic device 100 remains locked.

In another example, if the input sequence matches the sequence of security pattern 130 but the user does not lift the finger finger up) after completing the sequence of gestures, then the pattern may be determined as not yet complete and electronic device 100 may remain locked. For example, if the user traces the pattern up-right-down-up-right-down on touch interface 110 but keeps the finger down on touch interface 110, the pattern is not yet complete because the user's finger is still in contact with touch device 110 and may provide one or more additional input sequences that deviate from security pattern 130, though the sequence matches security pattern 130 shown in FIG. 2 up to that point. Thus, after tracing the correct input sequence on touch interface 110, electronic device 100 remains locked until the user's finger lifts away from touch interface 110. In other words, a pattern may be configured to be recognized as one or more continuous gestures made on touch interface 110 and ending with a distinct break of the input source from touch interface 110 (e.g., finger up).

Figures 3A, 3B, 3C:
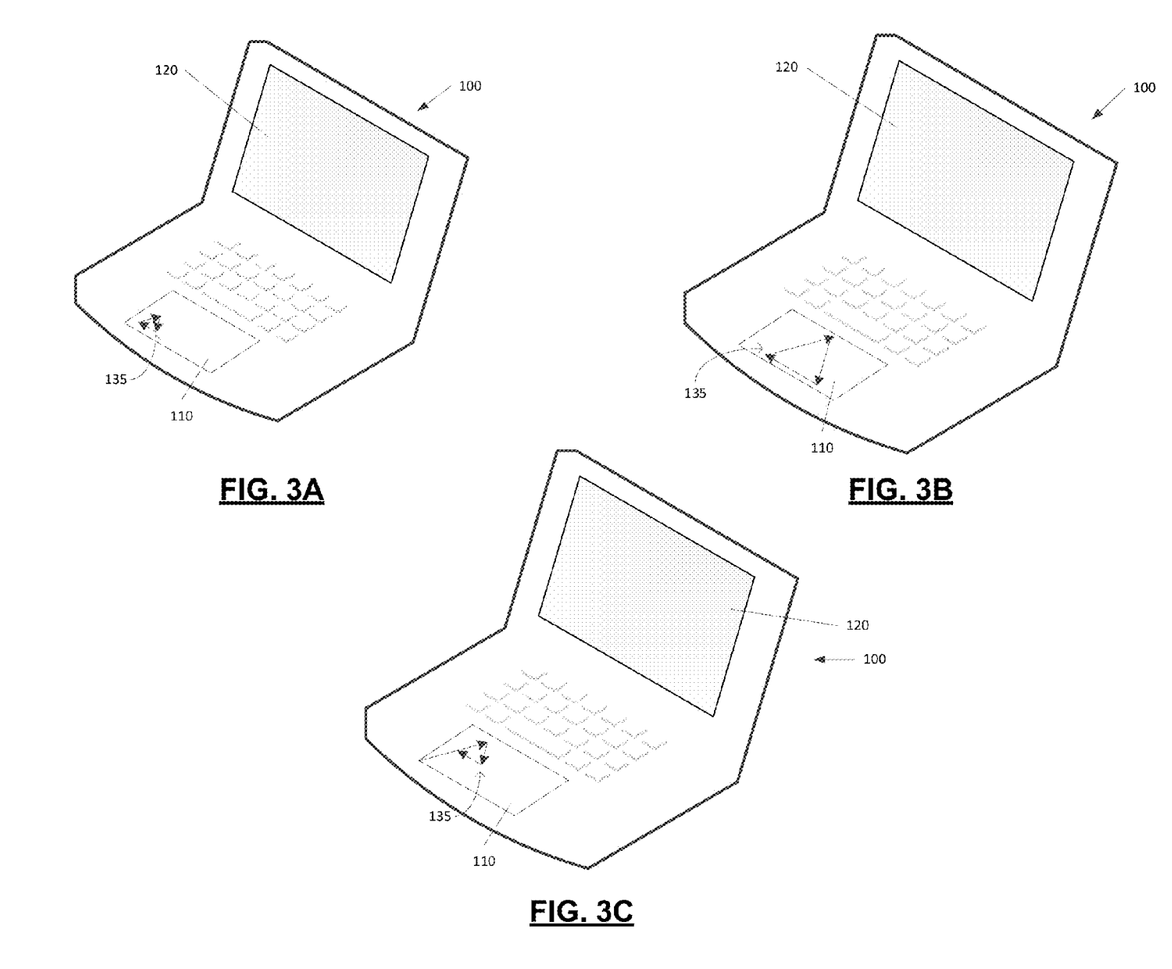
FIGS. 3A-3C illustrate examples of an unlock sequence performed by a user on a touch interface of the electronic device of FIG. 1.

A security pattern may be configured to be a relative pattern as opposed to a pattern based on gestures of discrete distances or locations. Here, the length or discrete locations of the gestures that are input on touch internee 110 are irrelevant and. It is the directionality of each continuous input gesture on touch interface 110 that is determinative. Thus, neither the size nor the specific location of the pattern drawn on touch interface 110 is compared to a security pattern. For example, as illustrated in FIGS. 3A-3C, the unlock sequence may be a security pattern 135 in the form of a triangle with the drawing gestures beginning at the bottom left corner. Security pattern 135 may be a small one-inch triangle drawn on a portion of touch interface 110 (see FIG. 3A), a large triangle drawn over the entire area of touch interface 110 (see FIG. 3B), or any other size that can be accommodated by touch interface 110. Any size triangle input sequence may be determined to match the triangle security pattern 135 and unlock electronic device 100.

Further, the three gestures used to form the triangle security pattern 135 on touch interface 110 may not have to be of the same magnitude. For example, the first gesture may be from the bottom left corner to the top mid-point of the trackpad (e.g., several inches long), while the second and third gestures may each be only an inch long (see FIG. 3C). While this does not yield a balanced or proportionate triangle, the changes in direction between gestures are the same as for the triangles described in FIGS. 3A and 3B. Accordingly, the pattern shown in each of FIGS. 3A-3C may be determined to match security pattern 135 and unlock electronic device 100. As discussed above, the location of the input pattern may also be varied while still matching security pattern 135. For example, the small triangle shown in FIG. 3A may be input at the lower left of touch interface 110, the center of touch interface 110, the middle right of touch interface 110, and the like. The need for discrete start and end points for the input gestures is thereby eliminated.

Any number of directional changes in input gestures may be used in tracing an input pattern on touch interface 110 (e.g., no cap or maximum), providing unlimited unlock combinations for improved security. Further, the input gestures may be non-linear gestures. For example, the input pattern may be a figure eight or infinity sign depending on the orientation of the input pattern as traced on touch interface 110. As another example, the input pattern may be a combination of linear and non-linear gestures like a five-pointed star with a circle on top. Any pattern or combination of continuous input gestures may be used to form a pattern that may be used as a security pattern, providing that contact between the input member (e.g., finger) and touch interface 110 is not interrupted (e.g., finger up, finger runs off of touch interface 110) before the input pattern is completed.

Determination of the directionality of input gestures may be focused on the ending movement of an input gesture. For example, as a first input gesture comes to an end and is followed by a second input gesture, the directionality determination of the first input gesture may be based on the last portion (e.g., last 10%) of the first input gesture while ignoring the other portion (e.g., first 90%) of the first input gesture. Returning to the example of triangle security pattern 135 discussed above, the directionality of the first up and to the right input gesture may be determined after the second down and to the right input gesture is begun. The change to the second input gesture may signal a change in direction, leading to determining the directionality of the first input gesture based on the direction of the last portion of the first input gesture just before the signaled change in direction begun by the second input gesture. Similarly, at the end of the last input gesture, the break in contact of the finger (e.g., finger up) may signal the end of the input pattern and the last portion of the final input gesture just before the finger up action may be used to determine the directionality of the last input gesture.

The speed of an input gesture may also be used in the determination of the directionality of the input gesture. For example, when a user traces a first input gesture and is preparing to change direction and start a second input gesture, the user's finger may slow down as it approaches the point of directional change. A detection or determination of a slowdown in the user's finger may be used to corroborate a change in direction and/or the portion of the current input gesture occurring after the detected slowdown may be the portion of the current input gesture used to determine the directionality of the current input gesture.

For example, in tracing the triangle of FIG. 3B, the user's finger may move up and to the right as the finger traces the first input gesture, slow down as it nears what will be the apex of the triangle before switching direction and moving down and to the right for the second input gesture. The user's finger may even come to a brief stop as the finger changes direction at the apex of the triangle. Thus, the user's finger speed may range from zero to the maximum speed achieved during each input gesture and the directionality determination of each input gesture may be based at least in part on (e.g., triggered by) the gesture speed falling below a speed threshold.

A security pattern may be stored in memory as a compilation of specific input measurements corresponding to input gestures made on a touch interface. The input measurements may be the physical direction of a gesture, the speed of any portion of a gesture, the ending portion of a gesture, and the like. For example, the triangle pattern discussed above may be configured as a compilation of physical directions of each gesture on the touch interface (e.g., first gesture is 45 degree angle up and to the right, second gesture is 45 degree angle down and to the right, third gesture is zero degree angle or straight left), where the physical direction of each gesture is associated with the last ten percent of the physical gesture before the speed of the gesture drops below a threshold amount. The specific compilation of input measurements is then stored in memory as a security pattern. Thus, when a series of input gestures is subsequently entered into a touch interface, the stored input measurements of the security pattern are compared to corresponding input measurements of the subsequently entered input gestures to determine if there is a match.

A security pattern may be provided with electronic device 100, in which case a user would need to learn the corresponding input pattern. A security or unlock pattern may also be generated by a user for electronic device 100. For example, electronic device 100 may have a password generation or reset mode where the user creates a pattern to be used as a security pattern for electronic device 100 by tracing a pattern on touch interface 110 while electronic device 100 is in a learning state. The newly learned pattern may be stored in memory of electronic device 100 as a security pattern for comparison to an input pattern entered on touch interface 110.

Electronic device may have more than one security pattern. For example, electronic device 100 may have a primary security pattern that allows access to most functions of electronic device 100, while a secondary security pattern may be needed to open an application (e.g., important personal information vault) or file (e.g., secure file) on electronic device 100. Here, the primary security pattern may be the up-right-down-up-right-down security pattern 130 shown in FIG. 2, while the secondary security pattern may be the triangle security pattern 135 shown in FIGS. 3A-3C. Different applications, files, communications interfaces, and the like may have separate security patterns, the same security pattern, or sub-groups may share one security pattern.

Different security patterns may require different input modes. For example, a tablet computer may recognize the device security pattern entered on the touchscreen of the tablet with a single finger, since the tablet is in locked mode and any touchscreen input is applied to the unlock process. However, once the tablet computer is unlocked, a second security pattern to unlock a secure feature may require using two fingers on the touchscreen because the unlocked tablet computer may recognized additional single finger input as a cursor control command and therefore not apply the additional single finger movements to the unlock process for the secure feature. Instead of using multiple fingers, the second security pattern may be recognized by using a focus on field function and then using a single finger to input the second security pattern. Continuing the tablet computer example, once the tablet computer is unlocked, the user may wish to access a secure social network feature. The user may select (e.g., touch) an icon representing the secure social network feature (e.g., focus on field function), after which single finger input on the touchscreen is recognized as an input pattern for the unlock process of the secure social network feature. Once the secure feature is unlocked, the tablet computer may revert back to recognizing single finger input as a cursor control command.

The number of fingers may be changed during input of a security pattern on the touch interface 110. Any combination of finger changes may be used as an additional input measurement associated with a security pattern. For example, a first portion of an input pattern may be drawn with one finger and a second portion of the input pattern may be drawn with a plurality of fingers (e.g., a user may begin drawing an input pattern on the touch interface 110 with one finger and part way through the input pattern the user may switch to two fingers to complete the pattern). As another example, the user may input a first portion of the security pattern with three fingers, input a second portion of the security pattern with two fingers, and input a third portion of the security pattern with one finger.

Inputting a security pattern may be combined with other security mechanisms. For example, a device may require a user to input a security pattern on the touchscreen and to capture an image of the user's face so that the device may use facial recognition to perform a face unlock as well. Other biometric security mechanisms (e.g., fingerprint recognition, voice recognition) may also be used in combination with the input of a security pattern, for example. A combination of security mechanisms may be factored (e.g., a touch gesture based input pattern and a facial recognition pattern may be combined as a two factor) to require that each security mechanism provide a positive match to the user's security profile in order to generate an unlock signal. Each security factor may provide separate unlock signal. For example, a match of the gesture based security pattern may provide a first unlock signal and a facial recognition match may provide a second unlock signal (e.g., face unlock), where both the first and second unlock signals are required to unlock the user device or the user account.

Figure 4:
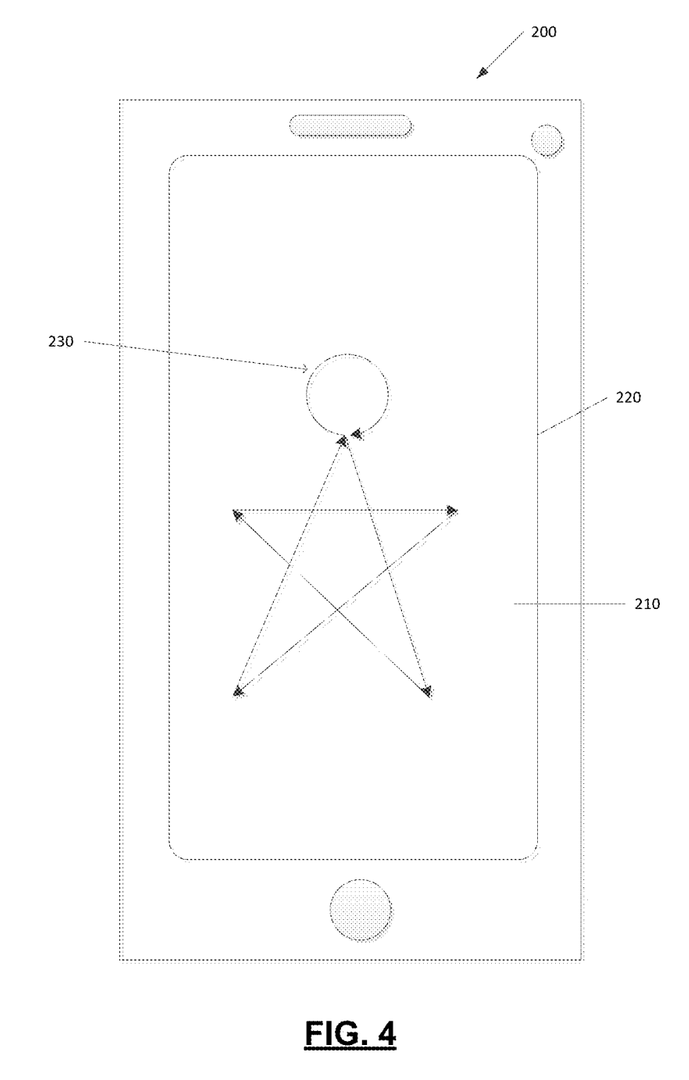
FIG. 4 illustrates an example of an unlock sequence performed by a user on a touch interface of another electronic device.

FIG. 4 shows an example of an electronic device 200 having a security pattern gestured or input on a touch interface 210 and display 220, where electronic device 200 is shown as a mobile device (e.g., smartphone, tablet). As shown in FIG. 4, the security pattern 230 may be a five-pointed star with a circle coming off of one of the points of the star.

Figure 5:
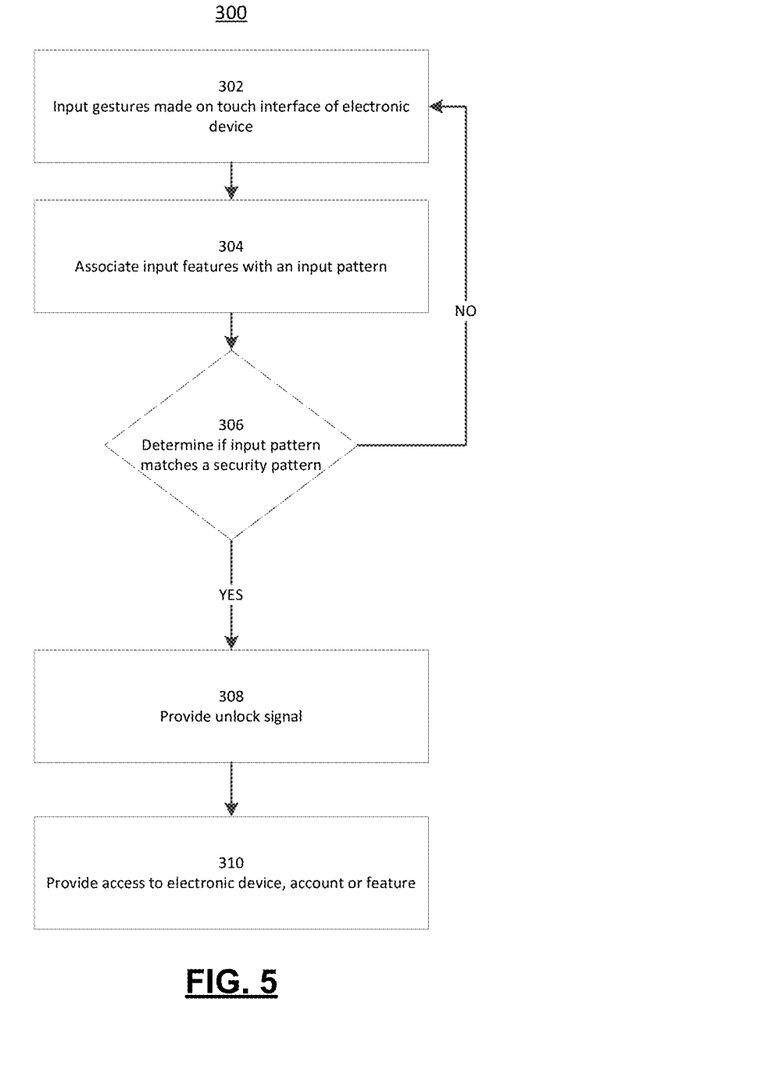
FIG. 5 illustrates an example process which provides for unlocking a user device or user account.

FIG. 5 illustrates an example process 300 which provides for unlocking an electronic device, account or feature. The process 300 begins at step 302 where one or more input gestures may be entered on touch interface of an electronic device (e.g., a locked mobile device). For example, a finger may be used to continuously trace two interconnected circles on the touchscreen display of a user's smartphone. The received input gestures are associated as an input pattern at step 304. Continuing the example, the input gestures of two interconnected circles are associated as a figure eight pattern. The pattern association may be done by the touch interface, a processor in the electronic device, or a combination of both.

At step 306, the input pattern is compared with a security pattern to determine if the patterns match. For example, a security pattern may be stored in memory of the electronic device. If the input pattern is determined to match the security pattern, an unlock signal is provided at step 308. For example, an unlock signal may be a software command, a register state change, an electrical signal, and the like. As an example, an unlock signal may be a software command executed by a processor that causes a new screen or window to be displayed on the electronic device display (e.g., the home screen of a smartphone). If the input pattern is determined not to match the security pattern, no unlock signal is provided and process 300 may begin again upon detecting the input of a new input gesture on the touch interface. Continuing the above example, if the security pattern is a figure eight, then the input pattern and the security pattern are determined to match and an unlock signal is provided to the smartphone. On the other hand, if the security pattern is a triangle, then the input pattern and the security pattern are determined not to match and no unlock signal is provided to the smartphone.

The process 300 ends at step 310 where the unlock signal provides access to the electronic device, account or feature. For the smartphone example, the unlock signal may cause the smartphone to unlock, providing access to applications, functions, files and the like that are stored on or accessible by the smartphone. On the other hand, if no unlock signal is provided, the smartphone remains locked and may wait to receive one or more new input gestures on the touchscreen display before beginning the unlock process again. In another example, the unlocked smartphone may not provide access to certain applications, functions, files, accounts, and the like (e.g., they are secure or restricted). In this example, selecting a restricted function may require unlock process 300 to be run again in order to unlock the restricted function. The security pattern for unlocking the restricted function may be the same or different than the security pattern for unlocking the smartphone.

A security pattern may function as a security pattern that replaces a password. Accordingly, any device, application, feature, account and the like may be configured to use a security pattern (e.g., unlock pattern) instead of a password, eliminating the need to memorize or write down and store one or more passwords. For example, a touchscreen on a bank cash machine (e.g., ATM) may require a user to input a security pattern associated with that user's account in order to process a transaction (e.g., withdraw cash from a checking account). Similarly to password strength, security patterns may vary from weak to strong. For example, a simple three digit number may be considered a weak password, while an eight character password having a mixture of letters, numbers and symbols may be considered a strong password. Similarly, a security pattern consisting of a single linear gesture angling up and to the right at a 45 degree angle may be considered a weak security pattern, while a security pattern consisting of a five-pointed star with a figure eight symbol on one of the points of the star may be considered a strong security pattern. Accordingly, a minimum level of pattern complexity may be required in order to be accepted as a legitimate security pattern.

Figure 6:
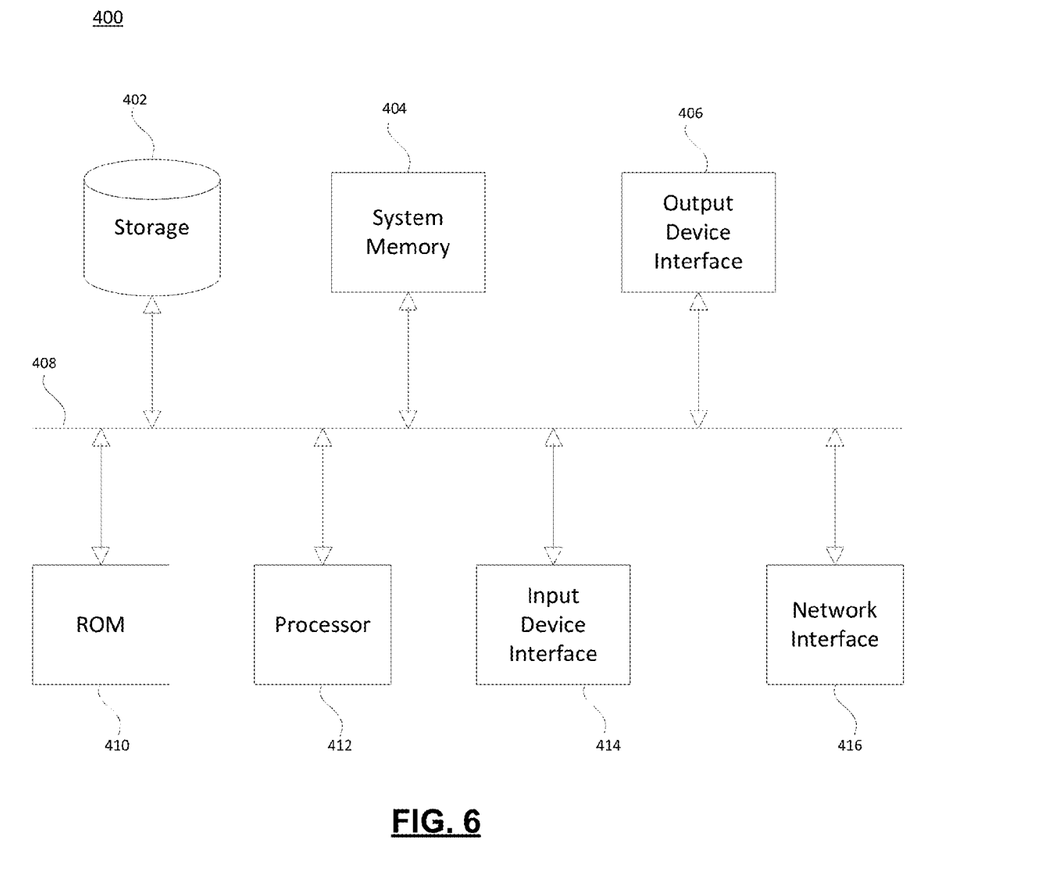
FIG. 6 conceptually illustrates an example electronic system with which some implementations of the subject technology can be implemented.

FIG. 6 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for unlocking an electronic device in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, liquid crystal displays (LCD). Some implementations include devices, for example, a touchscreen that functions as both input and output devices.

Further, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., an LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer implemented method, comprising:
    receiving, by one or more processors, an input pattern from a touch based input device, the input pattern comprising one or more directional changes corresponding to directional changes of user gestures made on the input device, wherein the directional changes are based on an end movement of each of the user gestures, and wherein a first portion of the input pattern is formed with one finger and a second portion of the input pattern is formed with a plurality of fingers;
    determining, by one or more processors, if the directional changes of the input pattern match directional changes of a security pattern associated with a user's security profile, wherein the determining does not compare a size or a specific location of the input pattern on the touch based input device with the security pattern; and
    providing an unlock signal if the directional changes of the input pattern match the directional changes of the security pattern, the unlock signal granting user access to a user device or a user account.

2. The computer implemented method of claim 1, wherein the security pattern is a compilation of input measurements corresponding to the user gestures made on a touch interface, the input measurements comprising the direction and speed of the end movement of each user gesture.

3. The computer implemented method of claim 1, wherein the determining if the directional changes of the input pattern match the directional changes of the security pattern is based on a speed of one or more of the user gestures.

4. The computer implemented method of claim 1, wherein the determining if the directional changes of the input pattern matches the directional changes of the security pattern is based on an end movement and a speed of one or more of the user gestures.

5. The computer implemented method of claim 1, wherein a portion of the security pattern corresponds to at least one linear user gesture.

6. The computer implemented method of claim 1, wherein a portion of the security pattern corresponds to at least one non-linear user gesture.

7. The computer implemented method of claim 1, wherein the input pattern is formed on the input device using a plurality of fingers.

8. The computer implemented method of claim 1, further comprising activating a focus on field function on the touch based input device to configure the touch based input device to receive the input pattern formed by using only one finger.

9. The computer implemented method of claim 1, wherein the touch based input device is a track pad associated with a computing device.

10. The computer implemented method of claim 1, wherein the touch based input device is a touchscreen associated with a computing device.

11. The computer implemented method of claim 1, further comprising:
  determining, by one or more processors, if a user's biometric input matches a biometric pattern in the user's security profile; and
  providing the unlock signal if the biometric input matches the biometric pattern.

12. The computer implemented method of claim 1, further comprising:
  receiving, by the one or more processors, a second input pattern from the touch based input device, the second input pattern comprising one or more directional changes corresponding to directional changes of user gestures made on the input device;
  determining, by the one or more processors, if the directional changes of the second input pattern match directional changes of a second security pattern associated with the user's security profile; and
  providing a second unlock signal if the directional changes of the second input pattern match the directional changes of the second security pattern, the second unlock signal granting user access to a secure feature on the user device.

13. The computer implemented method of claim 12, wherein the first security pattern and the second security pattern are different.

14. The computer implemented method of claim 12, wherein the first input pattern is formed on the input device using a single finger and the second input pattern is formed on the input device using a plurality of fingers.

15. The computer implemented method of claim 12, wherein the first input pattern is formed on the input device using a single finger, a focus on field function is activated on the touch based input device to configure the touch based input device to receive the second input pattern formed by using only one finger, and the second input pattern is formed on the input device using a single finger.

16. A computing device comprising:
  a touch based input device configured to receive a plurality of user gestures, the user gestures comprising an input pattern, wherein the input pattern comprises directional changes based on an end movement of each of the user gestures, and wherein a first portion of the input pattern is formed with a first number of fingers and a second portion of the input pattern is formed with a second and different number of fingers;
  a memory configured to store a security pattern; and
  one or more processors configured to determine a match between the input pattern and the security pattern associated with a user's security profile, wherein the determining does not compare a size or a specific location of the input pattern on the touch based input device with the security pattern, wherein an unlock signal is generated when a match between the input pattern and the security pattern is determined.

17. The computing device of claim 16, wherein the one or more processors are further configured to associate directional changes of the user gestures with the input pattern.

18. The computing device of claim 17, wherein the determining a match comprises determining a match between the directional changes associated with the input pattern and directional changes associated with the security pattern.

19. The computing device of claim 16, wherein the touch based input device is configured to receive a plurality of second user gestures, the second user gestures comprising a second input pattern, wherein the first user gestures are formed using a single finger and the second user gestures are formed using multiple fingers.

20. The computing device of claim 16, wherein the one or more processors are further configured to associate linearity of the user gestures with the input pattern.

21. A non-transitory machine-readable storage medium comprising machine readable instructions for causing a processor to execute a method for unlocking an electronic device, the method comprising:
  receiving an input pattern from a touch based input device, the input pattern comprising one or more directional changes corresponding to directional changes of user gestures made on the input device, wherein the directional changes are based on an end movement and a speed of each of the user gestures, and wherein a first portion of the input pattern is formed with one finger or a plurality of fingers, and a second portion of the input pattern is formed with the other of the one finger or the plurality of fingers;
  determining if the directional changes of the input pattern match directional changes of a security pattern associated with a user's security profile, wherein the determining does not compare a size or a specific location of the input pattern on the touch based input device with the security pattern; and
  providing an unlock signal if the directional changes of the input pattern match the directional changes of the security pattern, the unlock signal granting user access to a user device or a user account.

* * * * *